(12) United States Patent
Murray

(10) Patent No.: US 10,126,763 B2
(45) Date of Patent: Nov. 13, 2018

(54) POPPET VALVE

(71) Applicant: ROLLS-ROYCE plc, London (GB)

(72) Inventor: Christopher A. Murray, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/653,894

(22) Filed: Jul. 19, 2017

(65) Prior Publication Data

US 2018/0052475 A1    Feb. 22, 2018

(30) Foreign Application Priority Data

Aug. 19, 2016 (GB) .................................. 1614198.8

(51) Int. Cl.
*G05D 16/10* (2006.01)
*F02C 9/18* (2006.01)
(Continued)

(52) U.S. Cl.
CPC ............ *G05D 16/106* (2013.01); *F02C 9/18* (2013.01); *F16K 31/122* (2013.01);
(Continued)

(58) Field of Classification Search
CPC ............ Y10T 137/7798; F16K 31/122; F16K 31/124; G05D 16/106; G05D 16/166; F02C 9/18
See application file for complete search history.

(56) References Cited

U.S. PATENT DOCUMENTS 2,645,062 A * 7/1953 Senesky ............ G05D 16/0663
137/505.11
2,707,966 A * 5/1955 Taplin ................ G05D 16/0663
137/116.5
(Continued)

FOREIGN PATENT DOCUMENTS

EP    2808494 A1    12/2014
EP    2813688 A2    12/2014

OTHER PUBLICATIONS

Jan. 26, 2018 Search Report issued in European Patent Application No. 17182062.4.
(Continued)

*Primary Examiner* — William McCalister
(74) *Attorney, Agent, or Firm* — Oliff PLC

(57) ABSTRACT

The valve includes a casing arrangeable so the fluid in the passage flows over an outer side. The valve includes a piston axially slidably positionable within the casing, and the axial position regulates the fluid pressure in the poppet valve passage downstream, an annular clearance between the piston and casing. The valve includes a dynamic seal between the piston and casing to seal the annular clearance end. The valve includes a piston chamber located on the dynamic seal opposing side of the annular clearance so a leakage flow may cross the dynamic seal between the annular clearance and piston chamber. The fluid pressure in the piston chamber varies the axial position within the casing. A diversion path formed in the casing diverts fluid for the leakage flow into the annular clearance from the fluid flow in the passage, the diversion path having filter to filter debris from the diverted fluid.

12 Claims, 3 Drawing Sheets

(51) Int. Cl.
  *F16K 31/122* (2006.01)
  *F16K 31/124* (2006.01)
  *G05D 16/16* (2006.01)

(52) U.S. Cl.
  CPC ......... *F16K 31/124* (2013.01); *G05D 16/166* (2013.01); *Y10T 137/7798* (2015.04)

(56) References Cited

U.S. PATENT DOCUMENTS

| | | | | |
|---|---|---|---|---|
| 2,909,191 | A * | 10/1959 | Horton | A01C 23/024 137/501 |
| 2,918,081 | A * | 12/1959 | Lauer, Jr. | F16K 31/60 137/505.11 |
| 2,919,714 | A * | 1/1960 | Mrazek | F16K 1/126 137/220 |
| 2,950,732 | A * | 8/1960 | Lambert | F16K 1/126 137/219 |
| 3,297,047 | A * | 1/1967 | Sime | F16K 1/126 137/220 |
| 3,521,661 | A * | 7/1970 | Kurt | F04D 27/0215 137/220 |
| 3,566,907 | A * | 3/1971 | Sime | F16K 1/126 137/219 |
| 3,874,410 | A * | 4/1975 | Clark | G05D 16/10 137/220 |
| 4,175,584 | A * | 11/1979 | Rikuta | F16K 1/123 137/504 |
| 4,610,265 | A * | 9/1986 | Nelson | F16K 1/126 137/219 |
| 6,220,272 | B1 * | 4/2001 | Tavor | F16K 1/12 137/219 |
| 6,981,842 | B2 * | 1/2006 | D'Angelo | F01D 17/105 415/144 |
| 7,797,945 | B2 * | 9/2010 | Appleby | F02C 6/08 415/144 |
| 9,080,832 | B2 * | 7/2015 | Brahler, II | F41H 13/0006 |
| 2002/0189263 | A1 | 12/2002 | Rayer et al. | |
| 2010/0043899 | A1 | 2/2010 | Evanno et al. | |
| 2012/0234499 | A1 * | 9/2012 | Kunau | B60C 25/145 157/1.1 |
| 2016/0040798 | A1 * | 2/2016 | Kunau | F16K 24/04 137/12 |

OTHER PUBLICATIONS

Feb. 15, 2017 Search Report issued in British Patent Application No. 1614198.8.

* cited by examiner

POPPET VALVE

FIELD OF THE INVENTION

The present invention relates to the protection of a dynamic seal in a poppet valve.

BACKGROUND

Poppet valves can be used to regulate the pressure of a fluid within a system by adjusting the position of a piston within a valve casing. For example, a poppet valve may be used in a de-icing system of an aircraft to control the pressure of the air off-take from a compressor stage of a gas turbine engine, the hot off-take air being used to de-ice surfaces of the aircraft.

Conventional poppet valves (e.g. bullet valves, sleeve valves etc.) contain dynamic piston seals and guide rings to provide piston sealing and sliding guidance respectively. These seals and guides operate to reduce the pressure loss across piston to casing interfaces within the poppet valve, as well as to provide smooth guiding. When a dynamic piston seal is used in a flowing fluid system, there exists a differential pressure across the dynamic piston seal which can result in a leakage flow across the seal. This leakage flow exposes components to any contaminants that are suspended within the flowing fluid. The magnitude of the leakage flow is a function of the effectiveness of the seal as well as the pressure drop across the seal.

As a result of the leakage flow, contaminants that are suspended within the flowing fluid can be drawn through a clearance between the piston and the casing and across the dynamic piston seal. In particular, contaminant particles can lodge in the seal interfaces where they may seriously affect the functioning of the seal. For example, such particles can give rise to stiction and friction which overwhelm the force margins of the piston actuation system, and thus lead to seizure of the piston in the casing. Particularly in sandy and dusty environments, pressure-regulating poppet valves can quickly become clogged with solid contaminants around the dynamic piston seals, leading to shortened operational times before seizure.

One option to avoid ingress of solid contamination to dynamic piston seals is to replace dynamic piston seals with rolling glands which are mechanically sealed and connected to both the piston and the casing. The relative movement between the piston and casing is not hampered as the gland rolls (flexes) as the piston translates. In such systems there is no flow path across the gland and hence no leakage flow. Without such a leakage flow the quantity of solid contamination drawn into the gland area is so small (even in harsh sand and dust environments) that operational performance is not affected. However, rolling glands are manufactured from elastomerics and are not suitable for use in systems operating above about 240° C.

Therefore there is a need to provide poppet valves which are operable at high temperatures and in flowing fluid conditions where the fluid may contain contaminants.

SUMMARY

At its most general, the invention provides a poppet valve where leakage flow is filtered before reaching a dynamic seal.

Accordingly, in a first aspect, the invention provides a poppet valve for regulating a pressure of fluid in a passage, the valve including:

a casing arrangeable such that the fluid in the passage flows over an outer side thereof;

a piston axially slidably positionable within the casing, and configured such that the axial position of the piston regulates the fluid pressure in the passage downstream of the poppet valve, an annular clearance being provided between the piston and the casing;

a dynamic seal located between the piston and the casing to seal an end of the annular clearance; and a piston chamber located on an opposing side of the dynamic seal to the annular clearance such that a leakage flow of the fluid may cross the dynamic seal between the annular clearance and the piston chamber, the pressure of the fluid in the piston chamber being usable to vary the axial position of the piston within the casing;

wherein a diversion path formed in the casing diverts fluid for the leakage flow into the annular clearance from the fluid flow in the passage, the diversion path having a filter to filter debris from the diverted fluid Advantageously, by providing the filter-containing diversion path in the casing, any leakage flow can be filtered of contaminants before it reaches the dynamic seal.

In a second aspect, the invention provides a fluid pressure regulating system including:

a fluid inlet and a fluid outlet connected by a fluid passage; and the poppet valve according to the first aspect positioned within the fluid passage and operable to regulate fluid pressure from the inlet to the outlet.

In a third aspect, the invention provides a gas-turbine engine including the fluid pressure regulating system of the second aspect. For example, the fluid inlet may be connected to a compressor stage of the gas-turbine engine such that the fluid is air provided by the compressor. The fluid outlet may be connected to aircraft or engine auxiliary systems, such as oil cooling or de-icing systems.

Optional features of the invention will now be set out. These are applicable singly or in any combination with any aspect of the invention.

An opposite end of the annular clearance may form an opening to the passage, the diversion path being located between the ends of the annular clearance such that a first portion of the diverted fluid for the leakage flow flows along the annular clearance in a first axial direction, and a second portion of the diverted fluid flows along the annular clearance in the opposite axial direction to return at the opening to the fluid flow in the passage. Advantageously, this can deter any fluid flowing from the passage into the annular clearance via the opening and then along the annular clearance in the first axial direction towards the dynamic seal. The diversion path may be configured to promote fluid flow in the annular clearance in the opposite axial direction over fluid flow in the annular clearance in the first axial direction. Advantageously, this can reduce the amount of leakage flow across the dynamic seal and/or further deter fluid flowing from the passage into the opening. At least a portion of the diversion path may be angled so as to promote fluid flow in the opposite axial direction.

The filter may be a flow-washed filter at the entrance into the diversion path from the passage. Conveniently, this can help ensure that the filter does not become clogged in operation by contaminants present in the fluid flow.

The diversion path may be formed by one or more circumferential rows of through-holes in the casing. The entrances to the through-holes may be located within an annular recess on the outer side of the casing. The annular recess may be filled with filter material.

A total flow cross-sectional area of the diversion path may be larger than the effective flow area for the leakage flow across the dynamic seal, so that the diversion path does not act as flow-restrictor on the leakage flow.

A communication path may extend from the piston chamber to a source of control pressure for the fluid in the piston chamber. The communication path may extend as a bore in the casing, e.g. as a central bore. The source of control pressure may be a region of the passage downstream of the poppet valve.

The piston may form a valve face which is moved on axial sliding of the piston to vary a size of a regulating orifice formed between the valve face and a corresponding face of the passage, wherein when the valve face is moved into contact with the corresponding face the orifice is closed to block fluid flow in the passage. The piston may further include a wall member which axially separates a regulated pressure chamber from the piston chamber, the regulated pressure chamber may be fluid communication with a regulated pressure source, such that the size of the regulating orifice is determined by the pressure in the regulated pressure chamber and the pressure in the piston chamber. The pressure differential across the wall member between the regulated pressure chamber and the piston chamber in turn determines the axial position of the piston. The regulated pressure chamber may be a maintained at a fixed fluid pressure, i.e. connected with a fixed pressure source.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
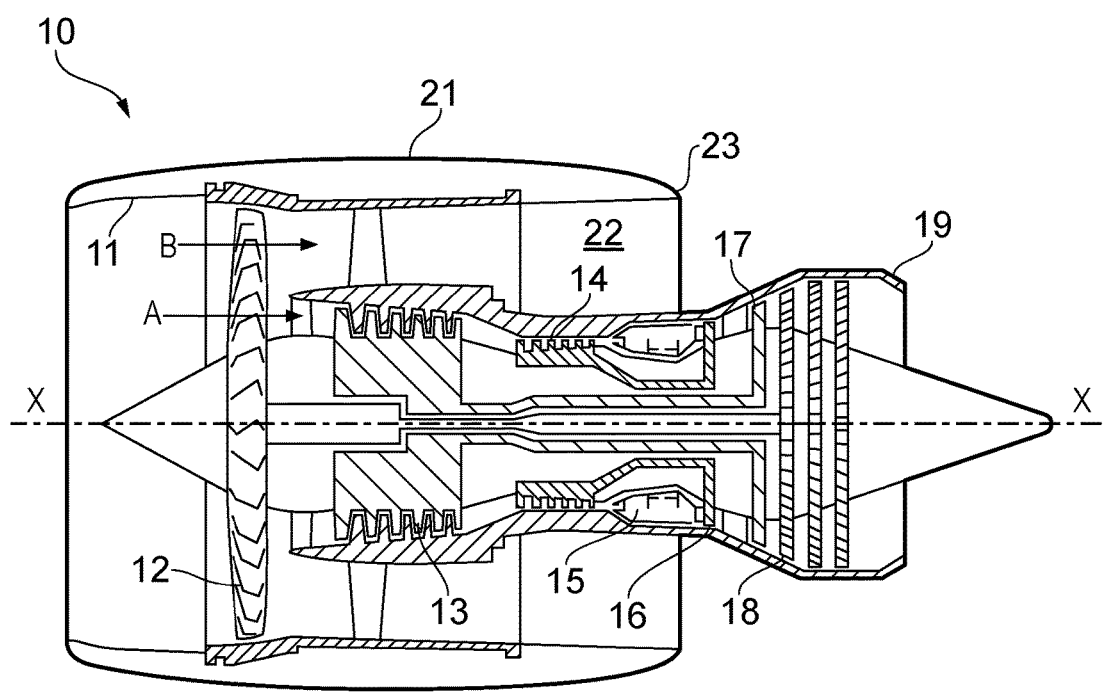
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Air can be tapped from the compressors 13, 14 for use in engine or aircraft auxiliary systems, for example, for oil cooling in the engine or wing de-icing in the aircraft. The offtake amount can be controlled and regulated via a poppet valve.

Figure 2A:
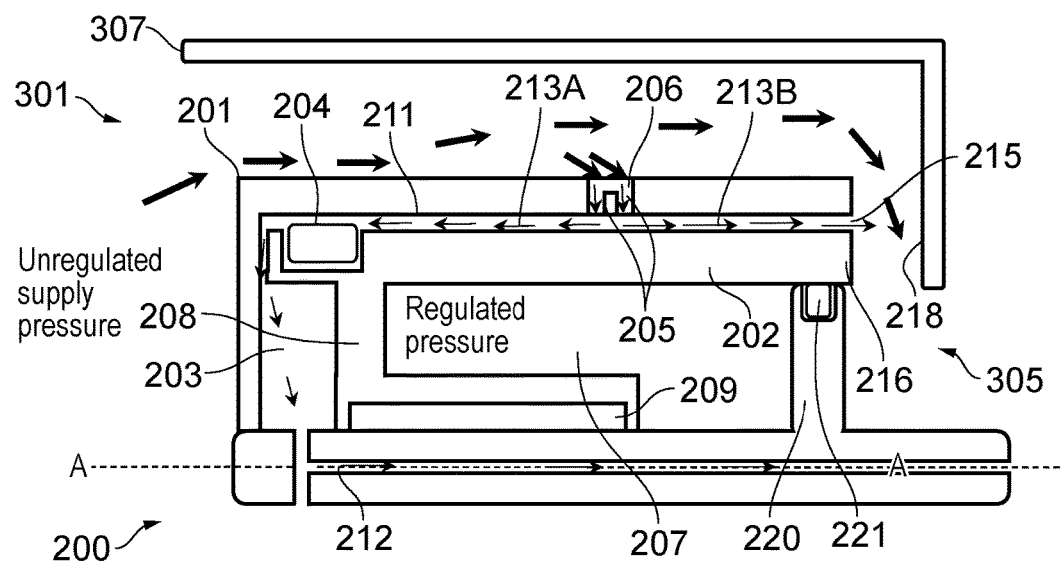
FIG. 2A shows schematically a half longitudinal cross-section through a poppet valve within a fluid passage.

Turning to FIG. 2A, there is shown a half longitudinal cross-section of such a poppet valve 200. The valve has a casing 201, which contains a piston 202. The valve in this example is located in a passage 307 along which fluid can flow over an outer side of the casing. The fluid passage extends between a passage inlet 301 and a passage outlet 305. The fluid flowing through the passage is indicated by thick arrows and is generally unfiltered, and so can include solid particulates such as sand, dust, etc. The piston is slidable along an axis A-A within the casing in order to control the flow of the fluid through the passage and over the casing. The fluid at the inlet to the passage is at an unregulated supply pressure, while the fluid at the outlet from the passage is at a regulated pressure controlled by the valve. The axial position of the piston is controlled via a piston chamber 203 which is formed between the piston and the casing, achieving a force balance with a regulated pressure region 207 discussed below. In some examples, the chamber is partially bounded by a wall member 208 of the piston. Between the outside of the piston and the casing there is an annular clearance 211, and in order to seal the annular clearance from the piston chamber, a dynamic seal 204 is carried by the piston at one end of the annular clearance near the piston chamber.

More particularly, the valve 200 is operable via a pressure differential that exists across the wall member 208 between the piston chamber 203 and the regulated pressure region 207. The regulated pressure region can be, for example, another chamber within the piston connected to a regulated (i.e. fixed or controllably variable) pressure source, while the piston chamber 203 may be connected via a communication path 212 to a downstream duct which senses the pressure of the fluid downstream of the valve. In this example, the communication path 212 is a bore formed in an internal, axial projection of the casing 201, the piston 202 being slidably mounted on the projection via a low friction guidance sleeve 209. The pressure differential causes the piston of the valve to slide along the axis 214, such that a valve face 216 formed at an end of the piston moves relative to a corresponding valve face 218 of the passage. The annular gap between the valve faces functions as a regulating orifice to regulate the pressure of fluid downstream of the valve face 216. The regulated pressure region 207 may conveniently be sealed from the passage outlet 305 by a wall member 220 which radially projects from the axial projection of the casing 201, and a seal 221 between the wall member 220 and the piston 202.

A diversion path 205 is formed in the casing 201, such that some of the fluid 210 passing over the casing is diverted into the annular clearance 211 at a location between the dynamic seal 204 at one end of the clearance and an opening 215 from the annular clearance to the passage 200 at the opposite end of the clearance. The diversion path has a fluid-washed filter 206 at its entrance such that the diverted fluid is filtered as it passes through the diversion path, thereby substantially removing any contaminants which might disrupt the dynamic seal, particularly by lodging in the interface between the dynamic seal and the casing. The diverted and filtered fluid is denoted by thin arrows. Some of the filtered fluid flows in a first axial direction 213A along the clearance towards the dynamic seal 204 and thus forms the leakage flow across the seal. The remaining filtered fluid flows in the opposite (second) axial direction 213B, towards the opening 215 to the passage, and thus discourages any backflow of unfiltered fluid entering the clearance via the opening 215.

Figure 2B:
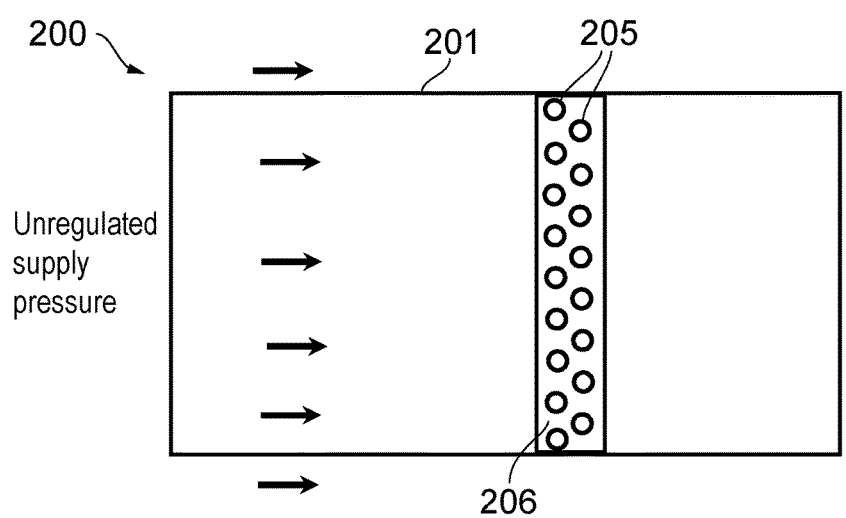
FIG. 2B shows schematically a side-on view of the poppet valve in FIG. 2A.

FIG. 2B is a side-on view of the poppet valve in FIG. 2A. The flow-washed filter 206 can be provided in an annular recess formed in the outer side of the casing 201 so that the flow-washed surface of the filter is flush with the outermost surface of the casing. The diversion path 205 can be provided as one or more circumferential rows of through-holes (of any suitable shape) with entrances in the bottom of the recess and extending generally radially through the casing (two such rows are illustrated in FIGS. 2A and B). The number of rows and/or the size/spacing of the holes can be adjusted depending on the fluid flow cross-section requirement. However, generally, the total flow cross-sectional area of the diversion path should be larger than the effective flow area for the leakage flow across the dynamic seal 204 so that the diversion path does not act as a flow restrictor on the leakage flow.

Figure 3:
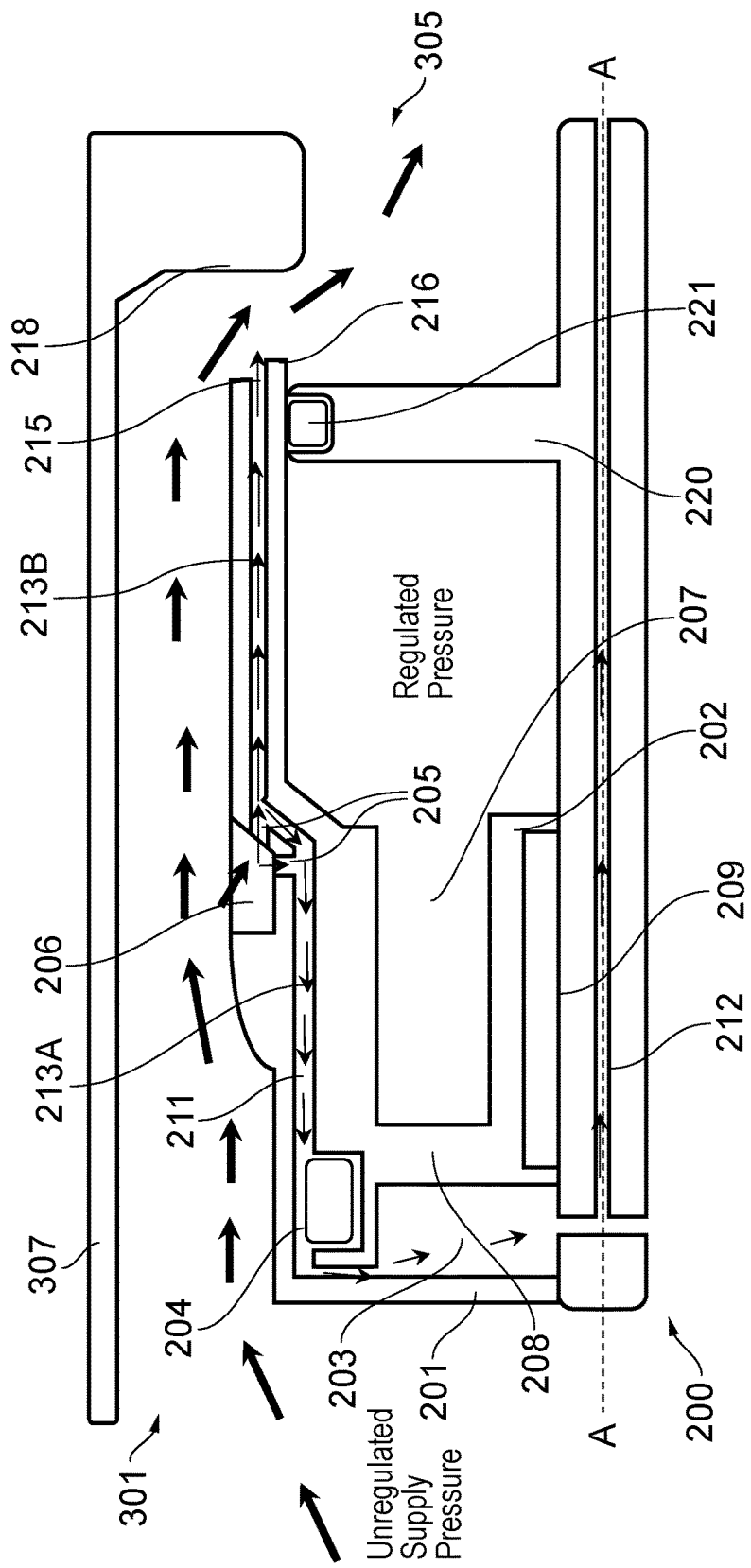
FIG. 3 shows schematically a half longitudinal cross-section of a variant poppet valve within a fluid passage.

Moving to FIG. 3, there is shown a half longitudinal cross-section of a variant poppet valve 200 within a fluid passage 307. The fluid passage again extends between a passage inlet 301 and a passage outlet 305. The poppet valve shown here shares many features with the poppet valve shown in FIGS. 2A and 2B, and so the same reference numerals are used where appropriate and these features are not discussed further.

In this variant, the diversion path 205 is again provided as two circumferential rows of through-holes. However, while the through-holes of the upstream row (relative to the flow through the passage 307) extend generally radially through the casing from entrances at the bottom of the annular recess holding the flow-washed filter 206, the through-holes of the downstream row have their entrances in a sidewall of the recess and are angled to align with axial direction of the casing, which is also the direction of flow of fluid flowing over the casing 201 and the direction of flow in the second axial direction 213B along the annular clearance 211. In this way, fluid passing through the diversion path has a preference (i.e. experiences fewer losses) for flow through the downstream row of through-holes, which promotes flow along the annular clearance in the second axial direction 213B over flow in the first axial direction 213A towards the dynamic seal 204. This further discourages any backflow of unfiltered fluid entering the clearance via the opening 215.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A poppet valve for regulating a pressure of a fluid in a passage, the valve including:
a casing arrangeable such that the fluid in the passage flows over an outer side thereof;
a piston axially slidably positionable within the casing, and configured such that the axial position of the piston regulates the fluid pressure in the passage downstream of the poppet valve, an annular clearance being provided between the piston and the casing;
a dynamic seal located between the piston and the casing to seal an end of the annular clearance; and
a piston chamber located on an opposing side of the dynamic seal to the annular clearance such that a leakage flow of the fluid may cross the dynamic seal between the annular clearance and the piston chamber, the pressure of fluid in the piston chamber being usable to vary the axial position of the piston within the casing;
wherein a diversion path formed in the casing diverts fluid for the leakage flow into the annular clearance from the fluid flow in the passage, the diversion path having a filter to filter debris from the diverted fluid.

2. The valve of claim 1, wherein an opposite end of the annular clearance forms an opening to the passage, the diversion path being located between the ends of the annular clearance such that a first portion of the diverted fluid for the leakage flow flows along the annular clearance in a first axial direction, and a second portion of the diverted fluid flows along the annular clearance in the opposite axial direction to return at the opening to the fluid flow in the passage.

3. The valve of claim 2, wherein the diversion path is configured to promote fluid flow in the annular clearance in the opposite axial direction over fluid flow in the annular clearance in the first axial direction.

4. The valve of claim 3, wherein at least a portion of the diversion path is angled so as to promote fluid flow in the opposite axial direction.

5. The valve of claim 1, wherein the filter is a flow-washed filter at the entrance into the diversion path from the passage.

6. The valve of claim 1, wherein the diversion path is formed by one or more circumferential rows of through-holes in the casing.

7. The valve of claim 1, wherein a total flow cross-sectional area of the diversion path is larger than the effective flow area for the leakage flow across the dynamic seal.

8. The valve of claim 1 further including a communication path extending from the piston chamber to a source of control pressure for the fluid in the piston chamber.

9. The valve of claim 1, wherein the piston forms a valve face which is moved on axial sliding of the piston to vary a size of a regulating orifice formed between the valve face and a corresponding face of the passage, wherein when the valve face is moved into contact with the corresponding face the orifice is closed to block fluid flow in the passage.

10. The valve of claim 9, wherein the piston further includes a wall member which axially separates a regulated pressure chamber from the piston chamber, the regulated pressure chamber being in fluid communication with a regulated pressure source, such that the size of the regulating orifice is determined by the pressure in the regulated pressure chamber and the pressure in the piston chamber.

11. A fluid pressure regulating system including:
a fluid inlet and a fluid outlet connected by a fluid passage; and
the poppet valve according to claim 1 positioned within the fluid passage and operable to regulate fluid pressure from the inlet to the outlet.

12. A gas-turbine engine including the fluid pressure regulating system of claim 11.

* * * * *